(12) United States Patent
Timings

(10) Patent No.: US 7,361,850 B2
(45) Date of Patent: Apr. 22, 2008

(54) METHOD AND APPARATUS FOR COUNTING ITEMS IN A CONTAINER

(75) Inventor: Bernard Austin Timings, Warwickshire (GB)

(73) Assignee: Ishida Europe Limited, Birmingham (GB)

( * ) Notice: Subject to any disclaimer, the term of this patent is extended or adjusted under 35 U.S.C. 154(b) by 0 days.

(21) Appl. No.: 10/539,258

(22) PCT Filed: Dec. 16, 2003

(86) PCT No.: PCT/GB03/05475

§ 371 (c)(1),
(2), (4) Date: Apr. 5, 2006

(87) PCT Pub. No.: WO2004/055486

PCT Pub. Date: Jul. 1, 2004

(65) Prior Publication Data

US 2006/0180357 A1    Aug. 17, 2006

(30) Foreign Application Priority Data

Dec. 16, 2002    (GB) ................................. 0229270.4

(51) Int. Cl.
*G01G 9/00*    (2006.01)
(52) U.S. Cl. .......................... 177/1; 177/25.17; 177/50
(58) Field of Classification Search ............. 177/25.17, 177/1, 50
See application file for complete search history.

(56) References Cited

U.S. PATENT DOCUMENTS

| 4,164,260 A | * | 8/1979 | Blodgett ......................... 177/1 |
| 4,508,186 A | * | 4/1985 | Sashiki et al. .................. 177/1 |
| 4,512,428 A | * | 4/1985 | Bullivant .................. 177/25.17 |
| 4,645,019 A | * | 2/1987 | Minamida et al. ....... 177/25.17 |
| 4,739,846 A | * | 4/1988 | Minamida et al. ............. 177/1 |
| 5,193,629 A | * | 3/1993 | Lare .......................... 177/25.17 |
| 6,396,002 B1 | | 5/2002 | Hove et al. |

FOREIGN PATENT DOCUMENTS

EP    0 605 164 A2    7/1994

* cited by examiner

*Primary Examiner*—Randy W Gibson

(57) ABSTRACT

A method for determining the quantity of items in a container is described, where each item has the same nominal weight located between upper and lower weight limits. The method comprises the following steps: (a) attempting to pack a pre-determined quantity, n, of the items to the container, the predetermined quantity, n, being selected such that the product of (n+1) and the lower weight limit exceeds the product of n and the upper weight limit and such that the product of n and the lower weight limit exceeds the product of (n−1) and the upper weight limit; (b) measuring the weight of the actual quantity of items packed in the container in step (a); and, (c) dividing the value of the weight ascertained in step (b) by the nominal weight to determine the actual quantity of items packed in the container in step (a).

16 Claims, 8 Drawing Sheets

METHOD AND APPARATUS FOR COUNTING ITEMS IN A CONTAINER

This invention relates to a method for determining the quantity of items packed in a container in order to ascertain whether a desired quantity of the items is present in the container.

Check weighers for use on production lines are well known. They are typically used to confirm that the quantity of items packed into a container is correct. One such system has a conveyor suspended on a load cell which produces a signal indicative of the weight of the container on the conveyor. Each packed container passes over this weighing conveyor before reaching the end of the line so that the quantity of items packed in the container can be confirmed to be the desired quantity. For example, crisp or potato chip packets are commonly supplied in cardboard containers of 48 individual packets and each individual packet weighs 30 grams. Thus, the check weigher will know that the correct quantity of crisp packets have been packed into the cardboard container if the nett weight is equal to the product of 48 packets and 30 grams, i.e. 1.44 kilograms.

However, each of these crisp packets has a weight tolerance of 1 gram. Thus, the cumulative tolerance of 48 packets of crisps means that the actual nett weight of the packed cardboard container is 1440 grams ±48 grams. This deviation of 48 grams is greater than the weight of an individual packet and so there is a possibility that either containers may be shipped with one too many or one too few packets of crisps or alternatively containers with the correct number of individual packets are rejected. Hence, there is a need for a check weigher that can accurately determine the quantity of items packed into a container on an automatic production line.

In accordance with a first aspect of the present invention, there is provided a method for determining the quantity of items in a container, each item having the same nominal weight located between upper and lower weight limits, the method comprising:

a. attempting to transfer a predetermined quantity, n, of the items to the container, the predetermined quantity, n, being selected such that the product of (n+1) and the lower weight limit exceeds the product of n and the upper weight limit and such that the product of n and the lower weight limit exceeds the product of (n−1) and the upper weight limit;

b. measuring the weight of the actual quantity of items transferred to the container in step (a); and, c. dividing the value of the weight ascertained in step (b) by the nominal weight to determine the actual quantity.

Thus, the invention provides a method for determining the quantity of items transferred to a container that is not affected by the cumulative weight tolerance of all the items that are transferred to the container.

In a preferred embodiment, step (a) involves attempting to pack the predetermined quantity of the items in the container and step (b) involves measuring the weight of the actual quantity of items packed in the container in step (a).

Normally, steps (a) to (c) are repeated until the sum of the predetermined quantities of step (a) of each repetition equals a specified quantity (typically corresponding to a "full" container). In this way, the method allows for determining the quantity of items packed into a container to be ascertained accurately and independently of the cumulative tolerance irrespective of the total quantity of items packed into the container.

Typically, the weight of step (b) is measured using a check weigher and this will preferably form part of a production line. Such a production line will normally include an upstream packaging machine.

In one example, the items packed in the container are packets of snack foods.

If the actual quantity determined in step (c) is different from the predetermined quantity of step (a) then the container may be conveyed to a reject location, for example a reject conveyor belt.

In such a case, if the actual quantity determined in step (c) is less than the predetermined quantity of step (a) then additional items may be packed in the container so that it does contain the predetermined quantity of items.

Alternatively, if the actual quantity determined in step (c) is more than the predetermined quantity of step (a) then the surplus items may be removed from the container so that it contains the predetermined quantity of items.

In a second aspect of the invention, there is provided apparatus for determining the quantity of items in a container, each item having the same nominal weight located between upper and lower weight limits, the apparatus comprising:

a. a transfer system for attempting to transfer a predetermined quantity, n, of the items to the container, the predetermined quantity, n, being selected such that the product of (n+1) and the lower weight limit exceeds the product of n and the upper weight limit and such that the product of n and the lower weight limit exceeds the product of (n−1) and the upper weight limit;

b. a weighing system for measuring the weight of the actual quantity of items transferred to the container in step (a); and, c. a controller for receiving, from the weighing system, a signal indicating the value of the weight ascertained in step (b) and for dividing this value by the nominal weight to determine the actual quantity of items packed in the container in step (a).

In one embodiment, the transfer system is a vacuum head and, in this case, the weighing system may be incorporated in the vacuum head.

Alternatively, the weighing system may be incorporated in a conveyor system that supports the container in use.

In another embodiment, the items are supplied to the transfer system by an infeed conveyor system for holding and conveying a group of items in a conveyance-direction, the infeed conveyor system comprising:

a first conveyor, including
a first roller,
a first conveyance member wound around said first roller,
a first items-group holder for conveying the group of items, said first items-group holder having a plurality of partition members that is connected to one another, and
a first detaching/attaching mechanism disposed between said first conveyance member and said first items-group holder for detachably and reattachably coupling said first items-group holder to said first conveyance member.

In this case, the transfer system transfers the group of items at the discharge position by pushing in a direction of the width of said first conveyance member.

Embodiments of the invention will now be described with reference to the accompanying drawings, in which.

Figure 1:
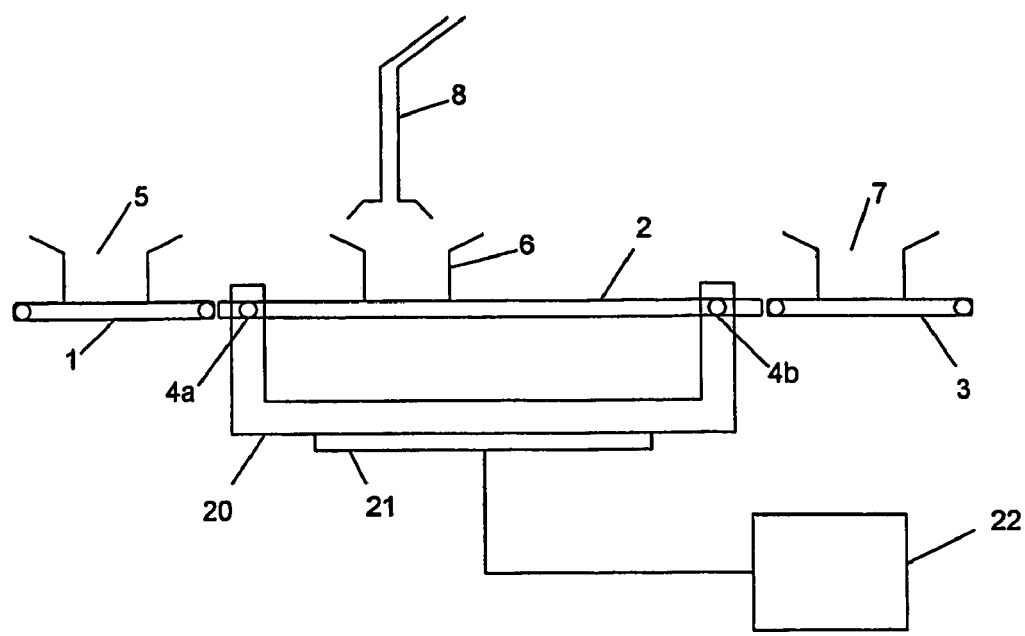
FIG. 1 shows a first embodiment in which a production line incorporates a check weigher for use with the invention.

FIG. 1 shows part of a production line used for packaging packets of snack foods, such as crisps. The production line comprises an infeed conveyor 1, a weighing conveyor 2 and an outfeed conveyor 3. The weighing conveyor 2 is supported on rollers 4a, 4b which are mounted on a support frame 20. This bears upon a load cell 21 which produces signals indicative of the weight suspended on conveyor 2 and supplies these to controller 22.

An empty container 5 ready for packing is held on infeed conveyor 1 whilst container 6 is packed as it is conveyed along weighing conveyor 2. A fully packed container 7 is conveyed away from weighing conveyor 2 by outfeed conveyor 3. The packets of snack foods are packed into container 6 using vacuum head 8 in a conventional way.

In this example, the packets of snack foods are crisp packets and the containers 5, 6, 7 are each intended to hold forty eight individual crisp packets. These packets have been filled by a packaging machine (not shown) controlled to ensure that each packet has a weight of 30 grams with a tolerance of ±1 gram.

Vacuum head 8 places eight packets of crisps into container 6 in one cycle. However, there is a possibility that too few packets will be packed by mistake. The quantity n of crisp packets packed into the container in one cycle by vacuum head 8 is selected such that the product of (n+1) and the lower weight limit of a crisp packet exceeds the product of n and the upper weight limit and such that the product of n and the lower weight limit of a crisp packet exceeds the product of (n−1) and the upper weight limit.

As previously mentioned, if all forty eight packets are packed into the container 6 before its weight is checked then it is not possible to determine whether a deviation of more than 30 grams from the correct net weight is due to the cumulative tolerance or due to there being one too few or one too many packets of crisps in the container.

In this instance, the upper and lower weight limits are 31 and 29 grams respectively and so setting n equal to eight satisfies both of the above criteria.

When the vacuum head 8 has released the crisp packets into container 6, the weight of the container 6 is measured and load cell 21 provides a signal indicative of this weight to controller 22. Controller 22 then divides the value of the weight of the crisp packets, allowing for the tare of container 6, by the nominal weight of a crisp packet (i.e. 30 grams). The actual quantity of crisp packets placed in the container by vacuum head 8 during that cycle can then be obtained by rounding the result of this division to the nearest integer. This cycle is repeated six times so that at the end of the process, container 6 should contain forty eight packets of crisps.

However, if during one of the six cycles only seven packets of crisps are loaded into container 6 then the controller 22 can detect this. This can be done in one of two ways. Firstly the controller 22 can add together the actual quantities of crisp packets packed in container 6 during each cycle and indicate an error if this total does not equal forty eight after all six cycles have been completed. Alternatively, the controller 22 can indicate an error as soon as it detects that only seven packets have been packed in the current cycle.

Figure 2:
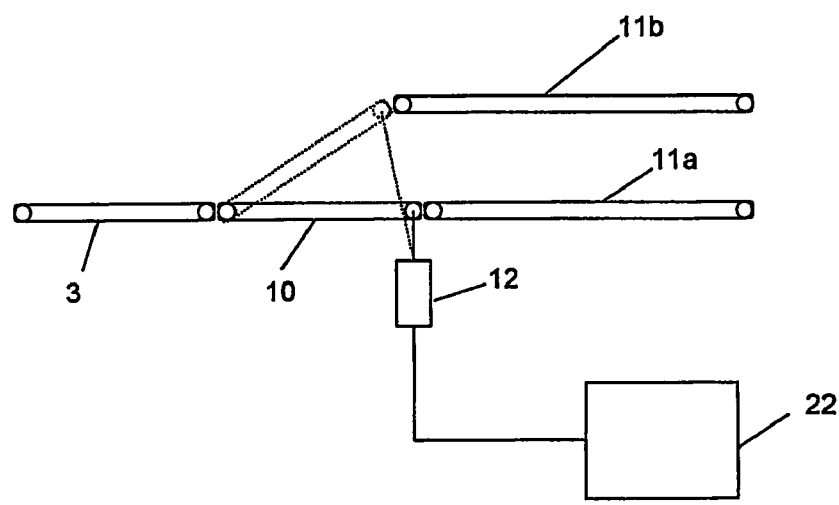
FIG. 2 shows apparatus for diverting containers to be rejected from the production line.

In the event that controller 22 indicates an error then container 6 can be diverted from the main production line. Apparatus for enabling this is shown in FIG. 2 in which the outfeed conveyor 3 leads to a moveable conveyor 10 which can direct containers either to conveyor 11a which forms a continuation of the main production line, or to reject conveyor 11b where the rejected containers can be dealt with appropriately. Moveable conveyor 10 is moved between its two positions using hydraulic ram 12 which is actuated by controller 22.

In the first embodiment it is also possible, instead of supporting the weighing conveyor 2 on a load cell 21, to support the vacuum head 8 on a load cell and measure the extra load on this when carrying packets.

In a second embodiment, a double loop conveyance apparatus is used. Such a conveyance apparatus is described in our European patent application, published as EP-A-1298079, which is herein incorporated by reference in it entirety.

The second embodiment of the present invention will now be described. In the following description, "front" and "rear" respectively refer to the lower-stream and upper-stream sides of the conveyance direction, while "left" and "right" respectively refer to the left and right sides relative to the conveyance direction.

Figure 3:
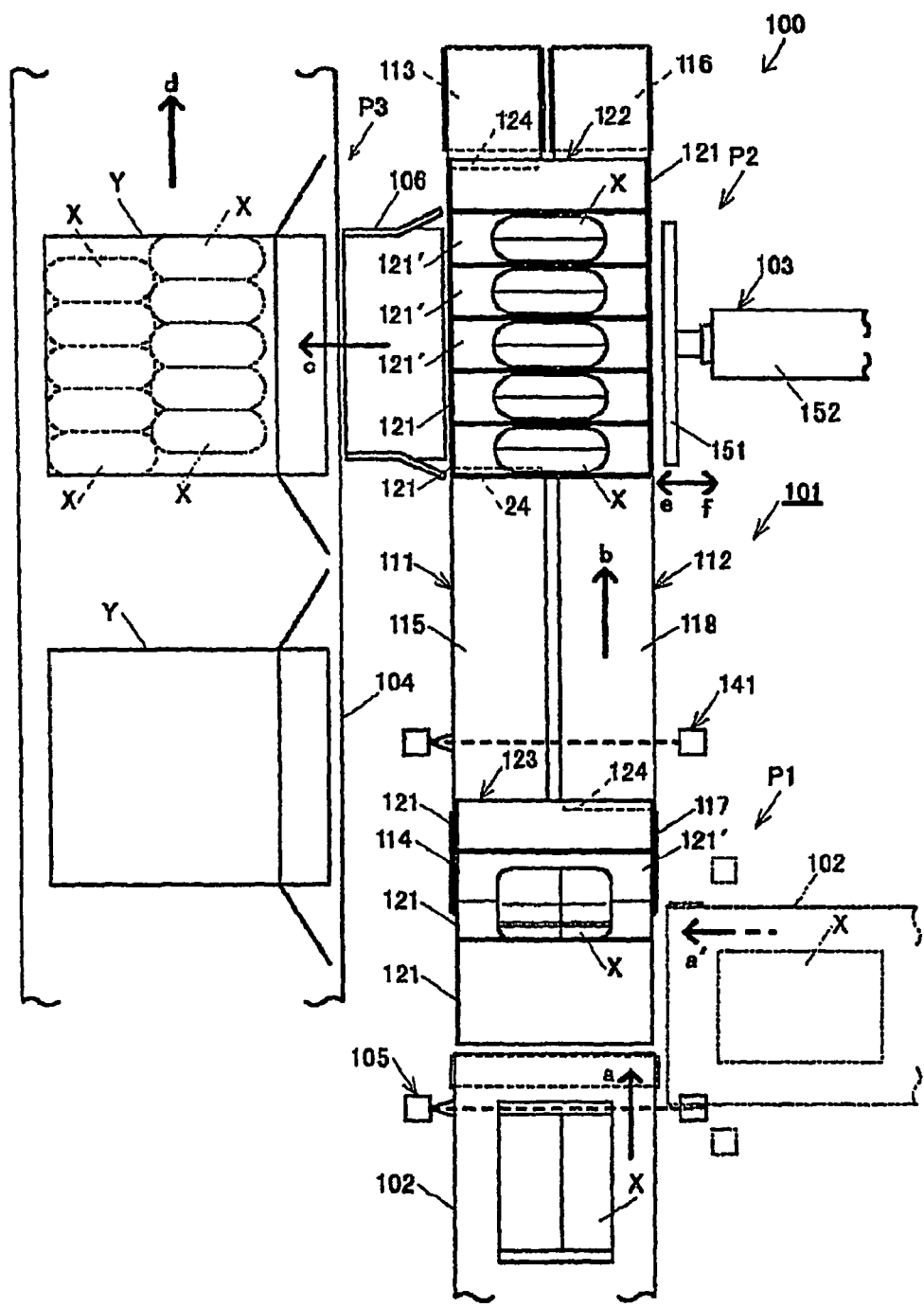
FIG. 3 is a schematic plan view of an entire structure of a boxing line that utilizes a conveyance apparatus incorporating the present invention.
Figure 4:
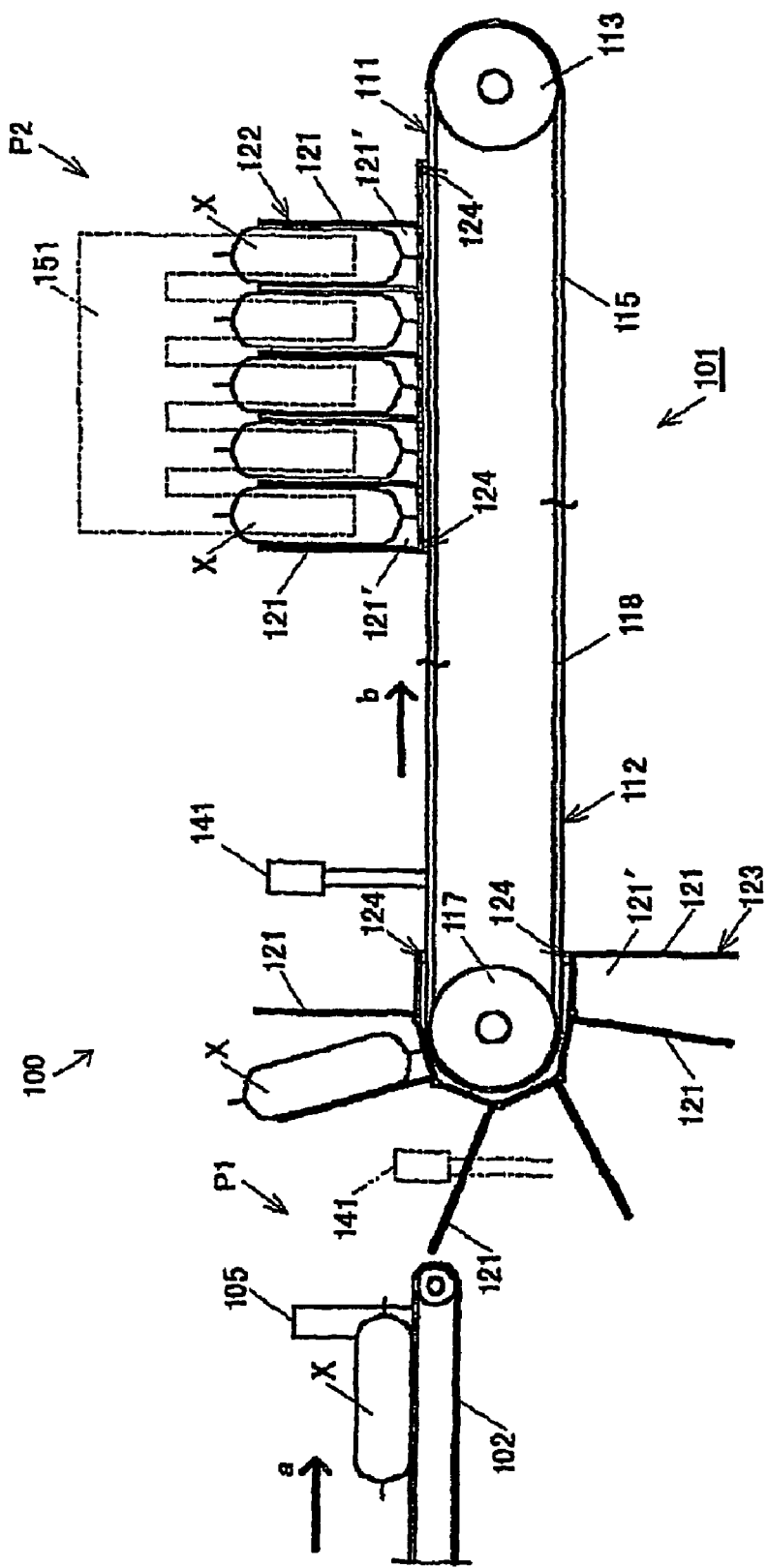
FIG. 4 is a schematic side view of the conveyance apparatus of FIG. 1.

The conveyance apparatus 101 is employed in a boxing line as shown in FIGS. 3 and 4.

This boxing line 100 is for compactly boxing items X . . . X, which are preferably food items such as potato chips packaged in bags. The boxing line 100 includes a loading conveyor 102, a discharge device (unloading apparatus) 103, and an unloading conveyor 104. The loading conveyor 102 is disposed on the upper-stream side of the conveyance apparatus 101. The loading conveyor 102 conveys items X . . . X from an apparatus on the further upper-stream side (for instance, a bag-manufacturing packaging apparatus) in a direction shown as arrow "a" and loads the items X . . . X onto the conveyance apparatus 101 at a loading position P1. The discharge device 103 is disposed on a side of the downstream side of the conveyance apparatus 101. The discharge device 103 discharges the items X . . . X, which are conveyed by the conveyance apparatus 101 in the direction shown as arrow "b," at the discharge position P2 in the direction shown as arrow "c" towards the other side of the conveyance apparatus 101. The unloading conveyor 104 conveys cardboard boxes Y . . . Y, which are disposed on the side of the unloading conveyor 104 and in which the discharged items X . . . X are boxed at the boxing position P3, further downstream as shown in the arrow "d."

First photoelectric sensors (example of detecting device) 105 are disposed near the end of the loading conveyor 102 such that the loading conveyor 102 is in between the first photoelectric sensors 105. The first photoelectric sensors 105 detect the items X . . . X to be loaded onto the conveyance apparatus 101, and sends a detection signal to a control unit 161 shown in FIG. 9. A guiding table 106 is placed on the discharge path of the items X . . . X between the conveyance apparatus 101 and the unloading conveyor 104 to guide the items X . . . X into the cardboard boxes Y . . . Y.

The conveyance apparatus 101 has a pair of first and second conveyors (conveyance member) 111 and 112, and a pair of first and second driving devices 111' and 112'. The first and second conveyors are disposed on the left and right sides so as to be parallel with the conveyance direction of the items X . . . X shown as arrow "b." The first conveyor 111 has toothed rollers 113 and 114 which are disposed on the front and rear, and a first conveyance belt 115 which is annular, toothed, and wound around the rollers 113 and 114. On the other hand, the second conveyor 112 has toothed rollers 116 and 117 which are disposed on the front and rear, and a second conveyance belt 118 which is annular, toothed, and wound around the rollers 116 and 117.

Figure 9:
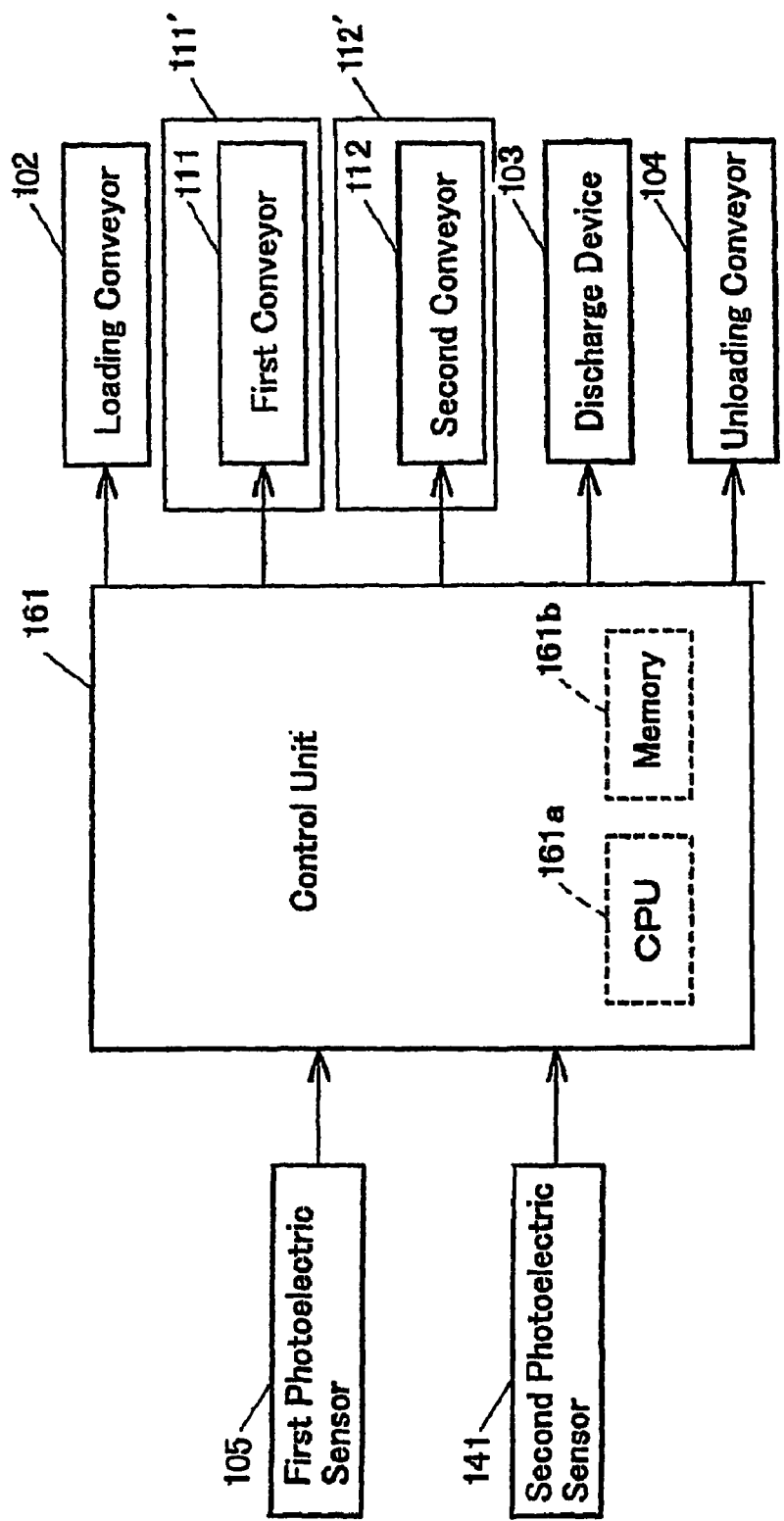
FIG. 9 is a view of the control system of the boxing line.

The first and second driving devices 111' and 112' are embodied by conventional devices such as motors. Since motors are well known in the art, these structures will not be discussed or illustrated in detail herein. As driving force from the first and second driving devices 111' and 112' shown in FIG. 9 is transmitted respectively to the front rollers 113 and 116, the conveyance belts 115 and 118 are driven independently to perform the operation.

A first items-group holder 122 is detachably and reattachably coupled to the first conveyor belt 115 via a pair of detaching/attaching devices 124 and 124 that is disposed on front and rear. The first items-group holder 122 has a predetermined number (6 in the figures) of L-shaped partition members 121 . . . 121 that is disposed with a predetermined space therebetween. The partition members 121 . . . 121 are connected in series, with each of the partition members 121 being disposed parallel with the conveyor-width direction. Similarly, a second items-group holder 123 is detachably and reattachably coupled to the second conveyor belt 118 via a pair of detaching/attaching devices 124 and 124 that is disposed on the front and the rear. The second items-group holder 123 has a predetermined number (6 in the figures) of L-shaped partition members 121 . . . 121 that is disposed with a predetermined space therebetween. The partition members 121 . . . 121 are connected in series, with each of the partition members 121 being disposed parallel with the conveyor-width direction.

A predetermined number (5 in the figures) of item holders 121' . . . 121' are formed in between adjacent partition members 121 . . . 121, such that each of the item holders 121' . . . 121' can hold one item X. As will be described later, the partition members 121 . . . 121 are sized conveyor-widthwise to bridge over both of the conveyor belts 115 and 116.

The first items-group holder 122 and the second items-group holder 123 have the same or similar structures. The coupling structure of the partition members 121 . . . 121 will be described taking the latter as an example.

Figure 5:
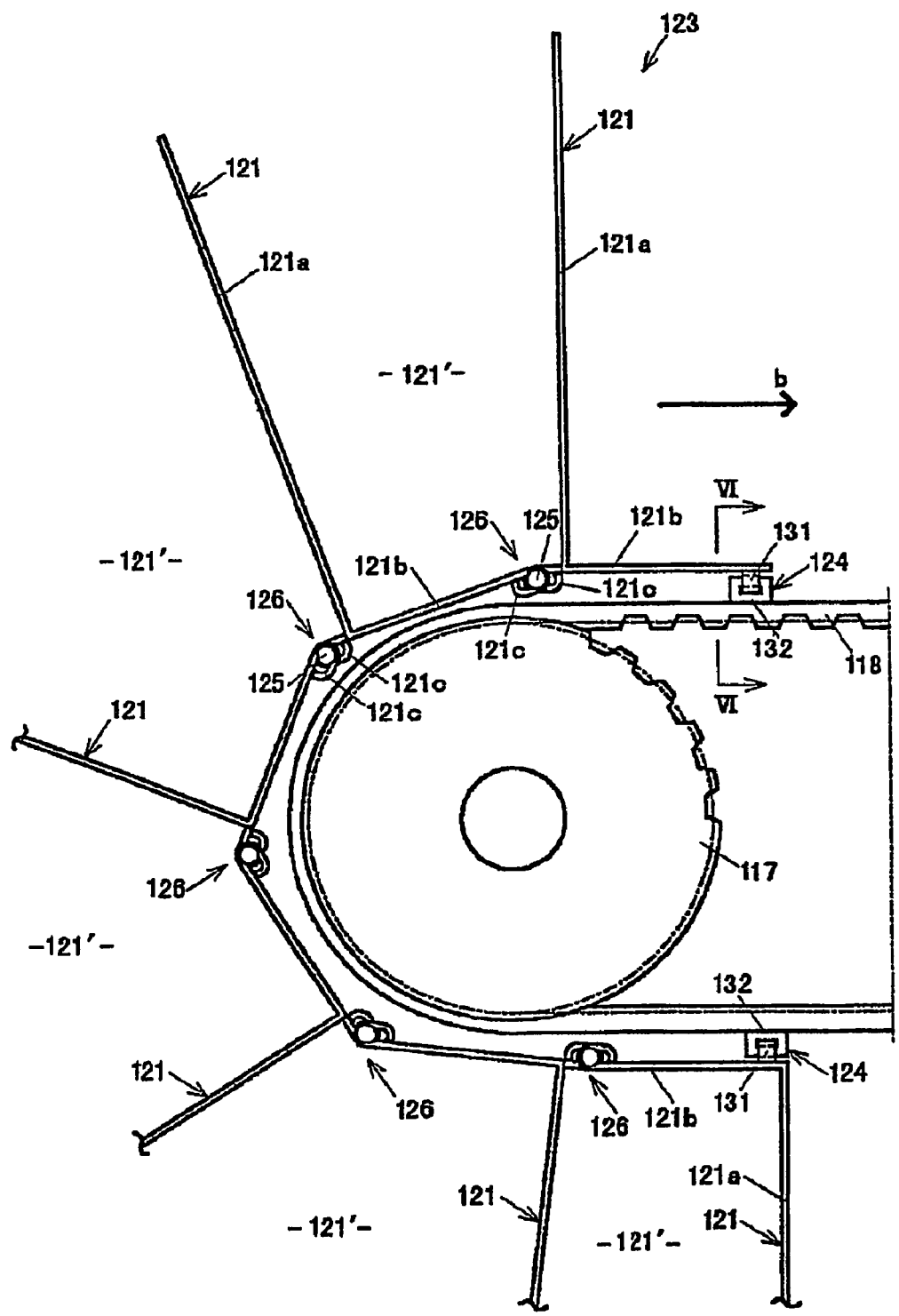
FIG. 5 is an enlarged side view of the vicinity of the upper side roller of the conveyance apparatus of FIG. 1.
Figure 6:
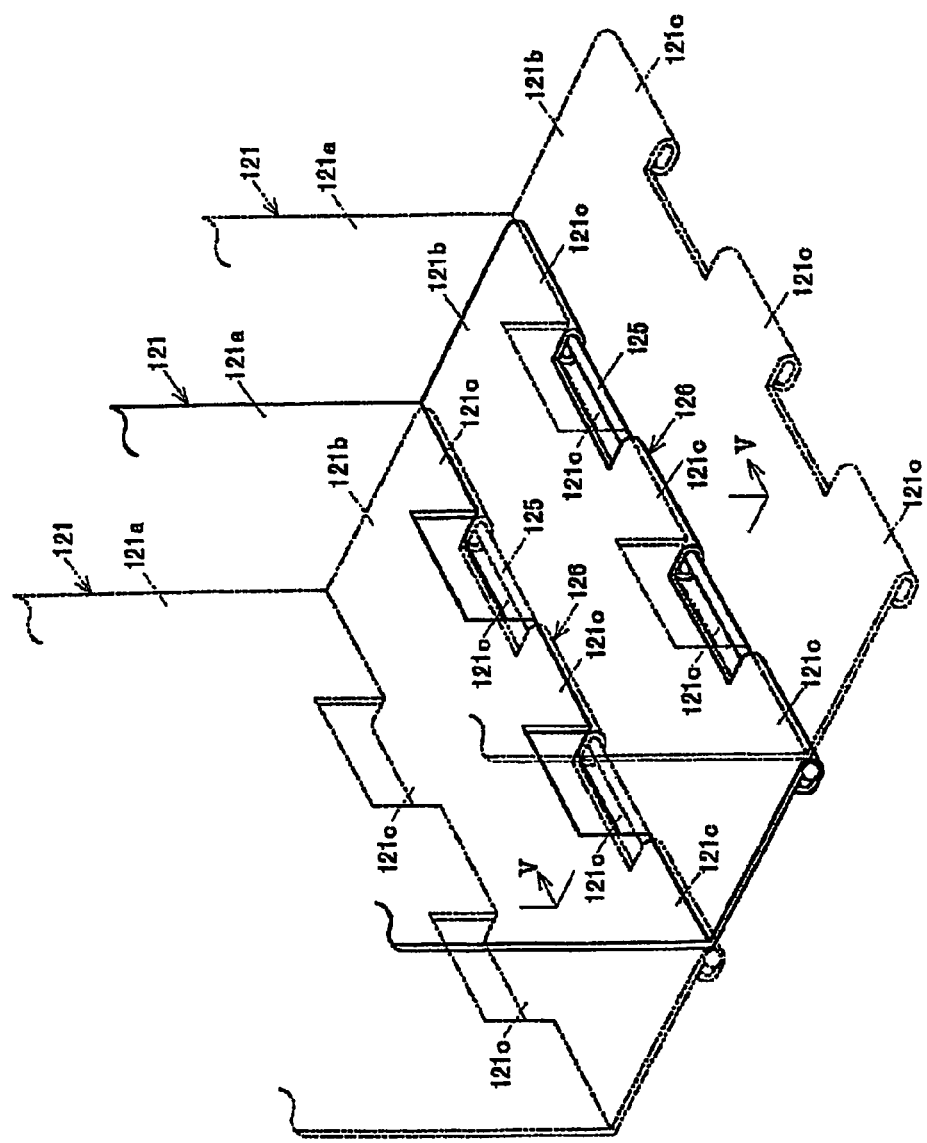
FIG. 6 is a perspective view that depicts the coupling structure of the partition members.
Figure 7:
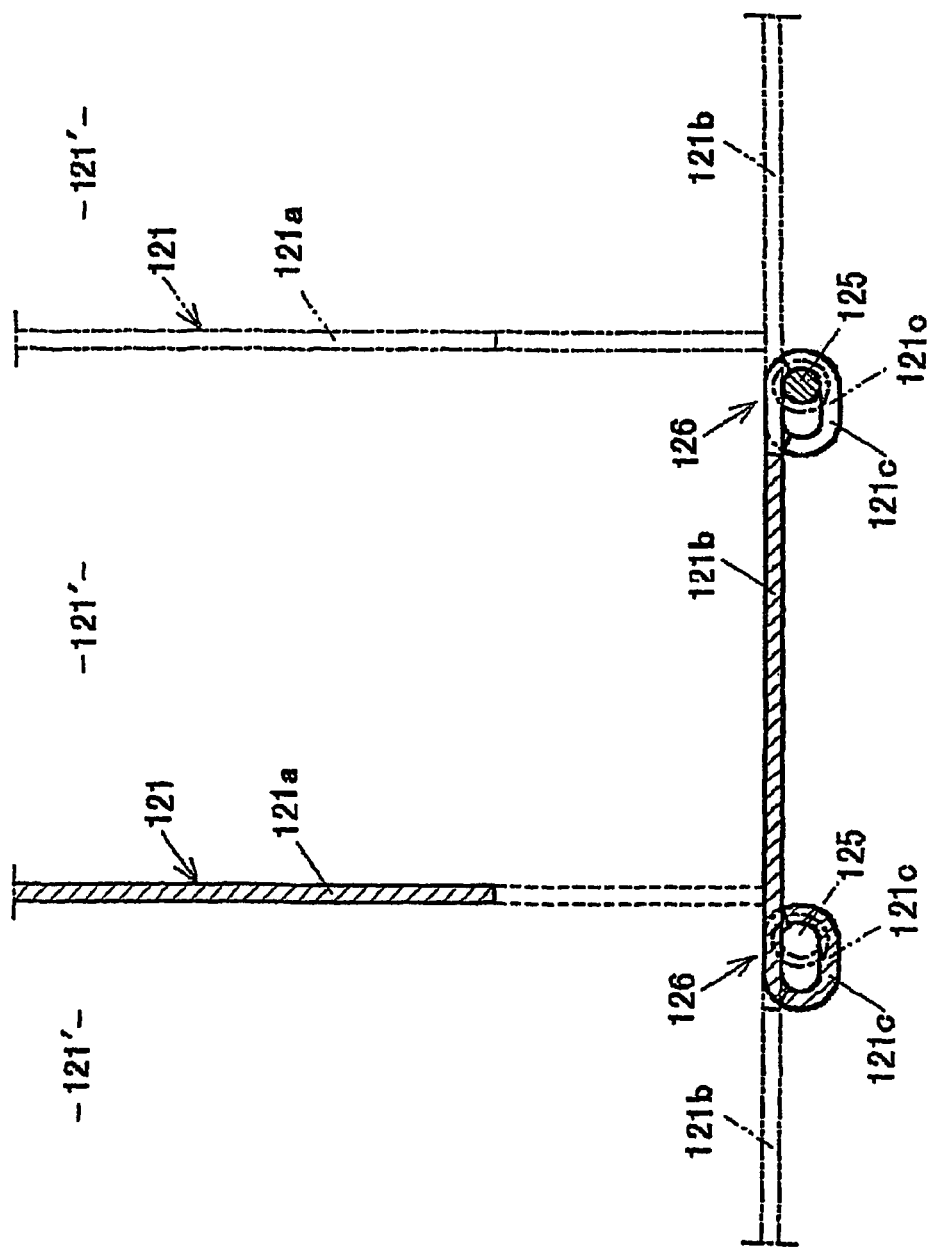
FIG. 7 is an enlarged cross-sectional view of the selected portion of the coupling structure as viewed from the arrow V-V in FIG. 6.

As shown in FIGS. 5-7, each partition member 121 has the shape of letter L in the elevational view, with a partitioning surface portion 121a and a bottom portion 121b that are sized to conform with the size of the item X to be conveyed. The partition members 121, except for the ones at front and rear ends, have a plurality of curved portions 121c . . . 121c (3 on the front and 2 on the rear in the figures) formed at the front and rear of the bottom portions 121b. The curved portions 121c form an oval space that extends in the conveyor-width direction. The partition member 121 on the front end has two curved portions 121c on its rear, while the partition member 121 on the rear end has three curved portions 121c on its front. The second items-group holder 123, in other words the items holders 121' . . . 121' is structured by the six partition members 121 that are connected as one unit via the curved portions 121c . . . 121c and a plurality of (five in the figures) hinge mechanisms 126 . . . 126. The hinge mechanism 126 includes a pin 125 that penetrates the oval space of the curved portions 121c . . . 121c.

The detaching/attaching device 124 will be described similarly taking the second items-group holder 123 as an example.

Figure 8:
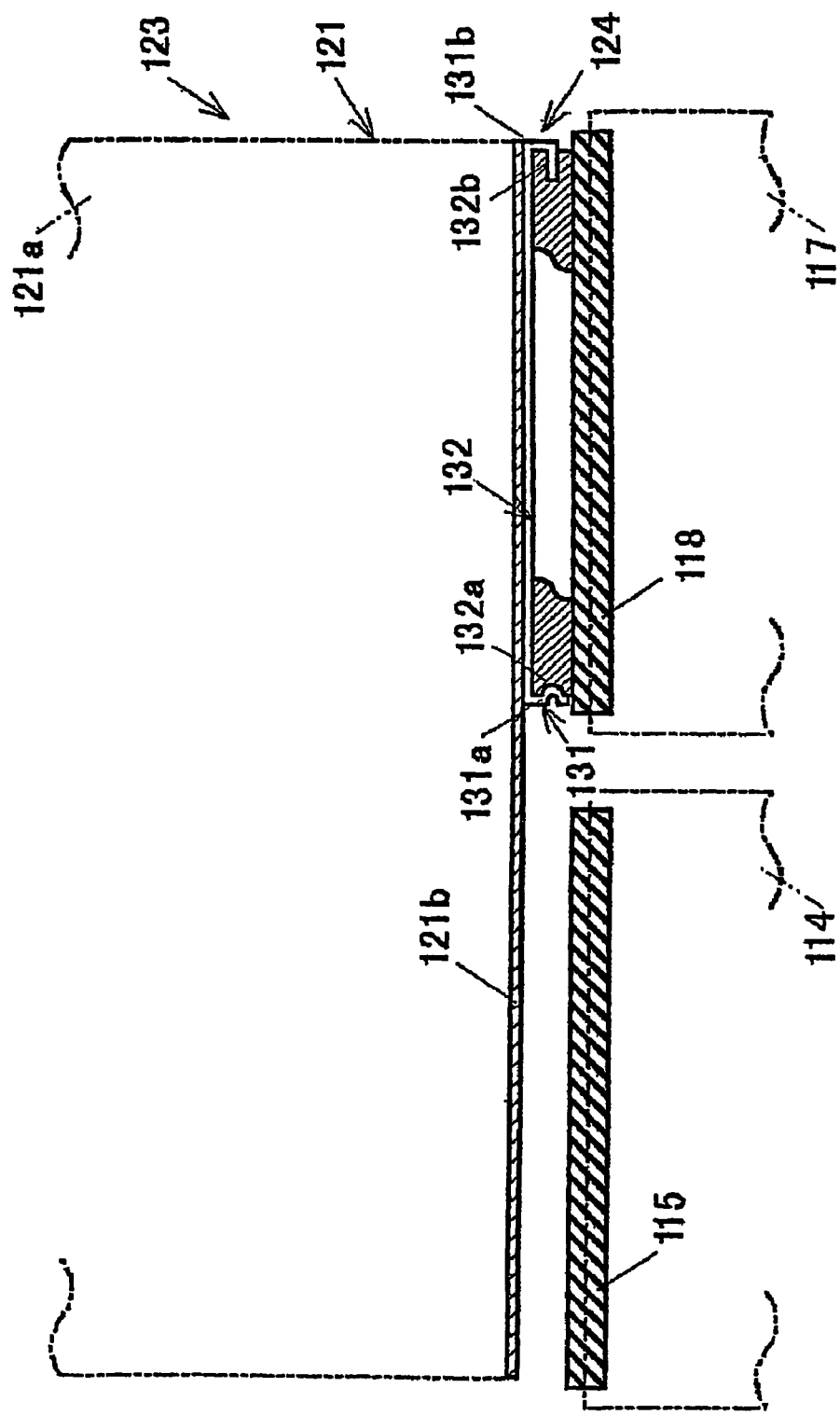
FIG. 8 is a partially broken cross-sectional view of the selected portion of the conveyance apparatus as viewed from the arrow VI-VI in FIG. 5, which depicts the detaching/attaching mechanism.

As shown in FIGS. 5 and 8, a detaching/attaching mechanism 124' is disposed in between the second items-group holder 123 and the second conveyance belt 118. The detaching/attaching mechanism 124' includes two of the detaching/attaching devices 124, each of which includes a hook member 131 and a receptacle 132. The hook member 131 includes a plate spring that is fixed to the bottom surface of the second items-group holder 123, in other words the bottom surface of the bottom portion 121b of the partition member 121. The hook member 131 is elongated in the conveyor-width direction. The receptacle 132 is fixed to the upper surface of the conveyor belt 118, and is elongated in the conveyor-width direction. The hook member 131 can be coupled to the receptacle 132 by coupling side portions 131a and 131b with concave portions 132a and 132b. The side portions 131a and 131b are formed by bending the left and right sides of the hook member 131 in different shapes. The concave portions 132a and 132b are formed by shaping the left and right sides of the receptacle 132 differently so as to match the shapes of the side portions 131a and 131b. Here, the side portions 131a and 131b and the concave portions 132a and 132b are formed such that the left side portion 131a and the left concave portion 132a engage each other relatively shallowly, while the right side portion 131b and the right concave portion 132b engage each other relatively deeply.

Left half portions of the partition members 121 . . . 121 extend above the first conveyor belt 115 without touching the first conveyor belt 115. The second items-group holder 123 is supported by the front and rear detaching/attaching devices 124 and 124 of the second conveyor belt 118 in a cantilever manner.

The only difference between the first items-group holder 122 and the second items-group holder 123 is that the similar detaching/attaching devices 124 and 124 are disposed in between the first items-group holder 122 and the first conveyor belt 115. Accordingly, explanation of the first items-group holder 122 will be omitted.

As shown in FIGS. 3 and 4, second photoelectric sensors 141 are placed at appropriate positions on the upstream side of the conveyance apparatus 101, such that the conveyors 111 and 112 are positioned in between the two second photoelectric sensors 141. The second photoelectric sensors 141 detect the number of the partitioning surface portions 121a . . . 121a or spaces between the partitioning surface portions 121a . . . 121a of the partitioning members 121 . . . 121 formed in the items-group holders 122 and 123 that pass the second photoelectric sensors 141.

As shown in FIGS. 3 and 4, the discharge device 103 has the shape of a comb, which can penetrate each of the item holders 121' . . . 121' of the items-group holders 122 and 123. The discharge device 103 includes a pusher member 151 and an air cylinder 152. The pusher member 151 pushes the items X . . . X held by each of the item holders 121' . . . 121' all at the same time. The air cylinder 152 moves the pusher member 151 in a direction that is perpendicular to the conveyance path, in other words in the direction shown as "e" and "f." The pusher member 151 can be alternatively driven by using a solenoid or a motor, instead of the air cylinder 152.

The control system of this boxing line is shown in FIG. 9. This control system includes the control unit 161 (driving control means and memory means) that controls the boxing line overall. The control unit 161 includes a CPU 161a that performs various calculation processes, and a memory 161b that stores initial configuration for each item and various control parameters.

The control unit 161 preferably includes a microcomputer with a control program that controls the first and second driving devices 111' and 112' as discussed below. The control unit 161 can also include other conventional components such as an input interface circuit, an output interface circuit, and storage devices such as a ROM (Read Only Memory) device and a RAM (Random Access Memory) device. The memory circuit stores processing results and control programs such as ones for driving control operation that are run by the processor circuit.

As seen in FIG. 9, the control unit 161 is operatively coupled to the first and second photoelectric sensors 105 and 141, the loading conveyor 102, the first and second conveyors 111 and 112, the discharge device 103, and the unloading conveyor 104. The control unit 161 is capable of selectively controlling any of the components of the control system in accordance with the control program. It will be apparent to those skilled in the art from this disclosure that the precise structure and algorithms for control system can be any combination of hardware and software that will carry out the functions of the present invention.

The CPU 161a outputs control signals to the loading conveyor 102, the first and second conveyors 111 and 112, the discharge device 103, and the unloading conveyor 104 to control driving of these devices. The CPU 161a receives inputs of detection signals from the first and second photoelectric sensors 105 and 141.

The memory 161b stores control parameters such as: the timing of the intermittent driving of the first and second conveyors 111 and 112, which is detected by the first photoelectric sensors 105 at the loading position P1 for each of the items X; the number of items X . . . X loaded per group; the conveyance speed and the conveyance time of the first and second conveyors 111 and 112 from the loading position P1 to the discharge position P2; the moving strokes of the pusher member 151 of the discharge device 103; and the timings of the intermittent driving of the unloading conveyor 104. The memory 161b stores holding parameters such as the number of partitioning surface portions and the space between the partitioning surface portions for each of various models of the items-group holder.

Effects of the conveyance apparatus 101 will now be described.

Referring to the conveyance operation, while the second items-group holder 123 is adjacent to the loading position P1, the CPU 161a of the control unit 161 drives the second conveyor belt 118 intermittently by a predetermined pitch, in other words by a space of the item holder 121', based on the item detection signals from the first photoelectric sensors 105. In this case, the loading conveyor 102, which carries the items X . . . X, also operates intermittently.

In other words, once the item X is detected by the first photoelectric sensors 105, the second conveyor belt 118 is stopped until a predetermined period of time elapses after the first photoelectric sensors 105 stop detecting items X. Once this predetermined period of time elapses, the second conveyor belt 118 operates only by a predetermined pitch. During this operation, the loading conveyor 102 is stopped. Next, when the second conveyor belt 118 stops, the loading conveyor 102 starts its operation. When five items X . . . X are supplied to the second items-group holder 123 by repeating these operations, the loading conveyor 102 stops. Then, the loading conveyor 102 repeats the aforedescribed operations when the first items-group holder 122 arrives.

In this manner, each of the item holders 121' . . . 121' of the second items-group holder 123 is provided with one of the items X . . . X, such that five items X . . . X are supplied to and held by the item holders 121' . . . 121' in the upright posture.

On the other hand, the first items-group holder 122, which already holds five items X . . . X in its item holders 121' . . . 121', arrives at the discharge position P2 after being conveyed by the first conveyor belt 115, and stops there. Then, as the pusher member 151 of the discharge device 103 moves onto the conveyance path, the items X . . . X held in the item holders 121' . . . 121' are all pushed out. The items X . . . X are packed in the cardboard box Y compactly in the upright position at the boxing position P3 after passing the guiding table 106. (See the drawing in chain line in FIG. 3.) The cardboard box Y is placed on the unloading conveyor 104 so as to oppose the discharge device 103 with the conveyance apparatus 101 therebetween. As the cardboard box Y, in which the predetermined number of items X . . . X are packed, is conveyed downstream by the unloading conveyor 104, a new empty cardboard box Y is conveyed from upstream, and stops at the position opposing the discharge device 103.

Once its item holders 121' . . . 121' are emptied, the first items-group holder 122 starts moving toward the loading position P1 on the first conveyor belt 115.

After the first items-group holder 122 leaves the discharge position P2, the second items-group holder 123, which has items X . . . X in its item holders 121' . . . 121' arrives at the discharge position P2. Then, the items X . . . X are discharged from the second items-group holder 123 in the same manner as described above regarding the first items-group holder 122. In the mean time, the first items-group holder 122 receives the items X . . . X at the loading position P1, in the same manner as described above regarding the second items-group holder 123.

In this manner, the first conveyor 111 and the second conveyor 112, in other words the first conveyor belt 115 and the second conveyor belt 118 are driven independently. While items X . . . X are discharged from the first items-group holder 122 or the second items-group holder 123 at the discharge position P2, the second items-group holder 123 or the first items-group holder 122 can receive items X . . . X from the loading conveyor 102 at the loading position P1. By repeating such operations intermittently, it is possible to perform the conveyance of items X . . . X at a high speed.

Since the partition members 121 . . . 121 that form the items-group holders 122 and 123 have the shape of letter L, the partition members 121 . . . 121 stand upright relative to the conveyor surface. Accordingly, there is no need for a complicated mechanism to support the items X . . . X in the upright position. Therefore, the structure of the conveyance apparatus can be kept simple, and its design can be simplified.

Also, the partition members 121 . . . 121 are connected to one another by connecting the bottom portion 121b . . . 121b with one another via the hinge mechanisms 126 . . . 126. Therefore, the items-group holders 122 and 123 are smoothly conveyed, following the movement of the conveyor belts 115 and 118. As a result, it is possible to prevent shock during the conveyance of the items X . . . X. This effect is particularly evident during the high-speed operation. Furthermore, at the loading position P1, in other words where the conveyor belts 115 and 118 turn around, the spaces between the upper portions of adjacent partition surface portions 121a . . . 121a, which are connected via the hinge mechanisms 126 . . . 126, expand. Accordingly, the items X . . . X can be loaded from the loading conveyor 102 onto the items-group holders 122 and 123 smoothly.

The partition members 121 . . . 121 are connected as one unit via a plurality of hinge mechanisms 126 . . . 126, which includes the curved portions 121c . . . 121c and the pins 125 that extend through the oval tubular spaces of the curved portions 121c . . . 121c. These partition members 121 . . . 121 are movable in the conveyance direction relative to each other. Therefore, the items-group holders 122 and 123 can be conveyed even more smoothly by following the conveyor belts 115 and 118, which operate in a circulating manner. Particularly, the items-group holders 122 and 123 can follow the conveyor belts 115 and 118 favorably even at portions where the conveyor belts 115 and 118 turn around.

Furthermore, since the detaching/attaching devices 124 are installed, it is easy to detach and reattach the items-group holders 122 and 123 from and to the conveyor belts 115 and 118. Since the number of detaching/attaching devices 124 and 124 provided with each of the items-group holders 122 and 123 is fewer (two in this embodiment on the front and rear) than the number of partition members 121 . . . 121 (six in this embodiment), it is much easier to detach and attach the items-group holders than the case where each of the partition members 121 . . . 121 needs to be individually attached to and detached from the conveyor belts.

Referring to the second items-group holder 123 in FIG. 8 as an example, the second items-group holder 123 can be attached to the second conveyor belt 118 easily by coupling the right side portion 131b of the hook member 131, which is a plate spring, and the right concave portion 132b of the receptacle 132 deeply first, and then coupling the left side portion 131a of the hook member 131 and the left concave portion 132a of the receptacle 132, pushing the second items-group holder 123 from above. On the other hand, when the second items-group holder 123 needs to be detached from the second conveyor belt 118, the second items-group holder 123 is first pulled up to disengage the engagement of the left side portion 131a of the hook member 131 and the left concave portion 132a of the receptacle 132a. Then, the right side portion 131b of the hook member 131 and the right concave portion 132b of the receptacle 132 can be disengaged from each other.

Alternatively, the left side portion 131a of the hook member 131 and the left concave portion 132a of the receptacle 132 can have the same or similar structure as the right side portion 131b and the right concave portion 132b. In this manner, the receptacle 132 is clamped tightly by the hook member 131 on both of its conveyor-width direction sides. Therefore, even during high-speed operation, the holder 123 can be supported by the conveyor belt 118 securely against the centrifugal force that occurs where the conveyor belt 118 turns around.

Referring to FIGS. 3, 4, and 9, when the type of items is changed, the items-group holders 122 and 123 may need to be replaced with a new type of items-group holders. In that case, it is possible, with the second photoelectric sensors 141, to detect the holding parameters of the items-group holders 122 and 123 such as the number of partitioning surface portions and the spaces between adjacent partitioning surface portions.

Once the detection signals are inputted from the photoelectric sensors 141 to the CPU 161a, the CPU 161a retrieves from the database stored in the memory 161b the control parameter that matches the detection signal. Then, the CPU 161a outputs driving control signals to related apparatuses such as the loading conveyor 102, the discharge device 103, the unloading conveyor 104, and the first and second conveyors 111 and 112, in other words the first and second conveyor belts 115 and 118. That is, the timings at which the loading conveyor 102 moves from the loading position P1 and at which the conveyor belts 115 and 118 move toward the discharge position P2 are thus controlled.

In this manner, the conveyance apparatus 101 is driven under conditions that are adequate for the new items-group holders. That way, operation of the conveyance apparatus 101 can be automated even further.

In this embodiment, the unloading conveyor 104 is supported on its own support frame (not shown) which bears upon a respective load cell (not shown). In this way, the unloading conveyor 104 of the second embodiment is supported in an identical manner to the weighing conveyor 2 of the first embodiment and operation of the load cells is identical.

The invention claimed is:

1. A method for determining the quantity of items in a container, each item having a same nominal weight between an upper weight limit and a lower weight limit, the method comprising:
    a. defining a predetermined quantity, n, of items to be transferred in a single transfer cycle into a container, n being selected such that a product of (n+1) and the lower weight limit exceeds a product of n and the upper weight limit and such that a product of n and the lower weight limit exceeds a product of (n−1) and the upper weight limit, and attempting to transfer n items into the container;
    b. measuring weight of an actual quantity of items transferred to the container in step (a); and,
    c. dividing a value of the weight ascertained in step (b) by the nominal weight to determine the actual quantity of items transferred in the container in step (a).

2. A method according to claim 1, wherein steps (a) to (c) are repeated until the sum of the predetermined quantities of step (a) of each repetition equals a specified quantity.

3. A method according to claim 1 or 2, wherein the weight of step (b) is measured using a check weigher.

4. A method according to claim 3, wherein the check weigher is part of a production line.

5. A method according to claim 4, wherein the production lines includes an upstream packaging machine.

6. A method according to claim 1 or 2, wherein the items are packets of snack foods.

7. A method according to claim 1 or 2, wherein if the actual quantity determined in step (c) is different from the predetermined quantity of step (a) then the container is conveyed to a reject location.

8. A method according to claim 7, wherein the reject location is a reject conveyor belt.

9. A method according to claim 7, wherein if the actual quantity determined in step (c) is less than the predetermined quantity of step (a) then additional items are packed in the container so that it does contain the predetermined quantity of items.

10. A method according to claim 7, wherein if the actual quantity determined in step (c) is more than the predetermined quantity of step (a) then the surplus items are removed from the container so that it contains the predetermined quantity of items.

11. Apparatus for determining the quantity of items in a container, each item having a same nominal weight between an upper weight limit and a lower weight limit, the apparatus comprising:
   a transfer system adapted to attempt to transfer a predetermined quantity, n, of items to a container in a single transfer cycle;
   a weighing system for measuring weight of an actual quantity of items transferred to the container by the transfer system; and,
   a controller for receiving, from the weighing system, a signal indicating a value of the measured weight and for dividing the value by the nominal weight to determine an actual quantity of items transferred in the container by the transfer system, wherein
   the predetermined quantity, n, is defined such that a product on n+1 and the lower weight limit exceeds a product of n and the upper weight limit, and a product of n and the lower weight limit exceeds a product of n−1 and the upper weight limit.

12. Apparatus according to claim 11, wherein the transfer system is a vacuum head.

13. Apparatus according to claim 12, wherein the weighing system in incorporated in the vacuum head.

14. Apparatus according to claim 11 or claim 12, wherein the weighing system is incorporated in a conveyor system that supports the container in use.

15. Apparatus according to claim 11, wherein the items are supplied to the transfer system by an infeed conveyor system for holding and conveying a group of items in a conveyance-direction, the infeed conveyor system comprising:
   a first conveyor, including
   a first roller,
   a first conveyance member wound around said first roller,
   a first items-group holder for conveying the group of items, said first items-group holder having a plurality of partition members that is connected to one another, and
   a first detaching/attaching mechanism disposed between said first conveyance member and said first items-group holder for detachably and reattachably coupling said first items-group holder to said first conveyance member.

16. Apparatus according to claim 15, wherein the transfer system transfers the group of items at the discharge position by pushing in a direction of the width of said first conveyance member.

* * * * *